(12) United States Patent
Lejeune, Jr.

(10) Patent No.: US 12,700,299 B2
(45) Date of Patent: *Aug. 4, 2026

(54) PREDICTIVE ANALYSIS SUPPORT OF REMOTE TRACKING

(71) Applicant: SATELLITE TRACKING OF PEOPLE LLC, Houston, TX (US)

(72) Inventor: David W. Lejeune, Jr., Conroe, TX (US)

(73) Assignee: SATELLITE TRACKING OF PEOPLE LLC, Houston, TX (US)

( * ) Notice: Subject to any disclaimer, the term of this patent is extended or adjusted under 35 U.S.C. 154(b) by 64 days.

This patent is subject to a terminal disclaimer.

(21) Appl. No.: 18/970,007

(22) Filed: Dec. 5, 2024

(65) Prior Publication Data

US 2025/0104551 A1     Mar. 27, 2025

Related U.S. Application Data

(63) Continuation of application No. 18/336,164, filed on Jun. 16, 2023, now Pat. No. 12,190,713, which is a
(Continued)

(51) Int. Cl.
*G08B 29/18* (2006.01)
*G08B 21/18* (2006.01)
(Continued)

(52) U.S. Cl.
CPC ......... *G08B 29/181* (2013.01); *G08B 21/182* (2013.01); *G08B 31/00* (2013.01); *H04W 4/029* (2018.02)

(58) Field of Classification Search
CPC .... G08B 29/181; G08B 21/182; G08B 31/00; G08B 21/22; H04W 4/029
See application file for complete search history.

(56) References Cited

U.S. PATENT DOCUMENTS 8,862,152 B1    10/2014   Buchholz et al.
9,263,898 B1     2/2016   Ghazarian
(Continued)

FOREIGN PATENT DOCUMENTS

EP        2894488 A1       7/2015
GB        2533963 A        2/2015
WO     2018/185750 A1     10/2018

*Primary Examiner* — An T Nguyen
(74) *Attorney, Agent, or Firm* — GREENBLUM & BERNSTEIN, P.L.C.

(57)                ABSTRACT
A method for predictive analysis for maintaining a battery charge of a personal monitoring device is provided. The method includes: locking the personal monitoring device to a limb of a monitored person; collecting historical information about the personal monitoring device including movement data of the personal monitoring device and battery charging history of the personal monitoring device; analyzing the collected historical information for patterns of battery charging behavior; receiving a current location of the personal monitoring device; determining whether to send a battery charge reminder to the monitored person, based on at least a current location of the personal monitoring device, a current batter charge, and the patterns of battery charging behavior; and providing, in response to a positive outcome of the determining, a notification to the monitored person to charge the battery.

14 Claims, 11 Drawing Sheets

Related U.S. Application Data continuation of application No. 17/338,100, filed on Jun. 3, 2021, now Pat. No. 11,721,200.

(51) Int. Cl.
  *G08B 31/00*       (2006.01)
  *H04W 4/029*       (2018.01)

(56)              References Cited

U.S. PATENT DOCUMENTS

| | | | | |
|---|---|---|---|---|
| 9,867,017 | B1 * | 1/2018 | Bacarella | H04W 4/029 |
| 9,955,313 | B1 * | 4/2018 | Bacarella | H04W 4/029 |
| 9,955,314 | B1 * | 4/2018 | Bacarella | H04W 4/029 |
| 11,062,584 | B1 | 7/2021 | Magaletta | |
| 2003/0149526 | A1 | 8/2003 | Zhou | |
| 2006/0135217 | A1 | 6/2006 | Sung et al. | |
| 2008/0055109 | A1 | 3/2008 | Freathy et al. | |
| 2012/0235860 | A1 | 9/2012 | Ghazarian | |
| 2016/0087488 | A1 | 3/2016 | Ghazarian et al. | |
| 2017/0262606 | A1 | 9/2017 | Abdullah et al. | |
| 2018/0198311 | A1 | 7/2018 | Mahmoud et al. | |
| 2019/0235604 | A1 | 8/2019 | VanBlon et al. | |
| 2020/0310514 | A1 * | 10/2020 | Nicholson | G06F 16/22 |

* cited by examiner

104

102

102

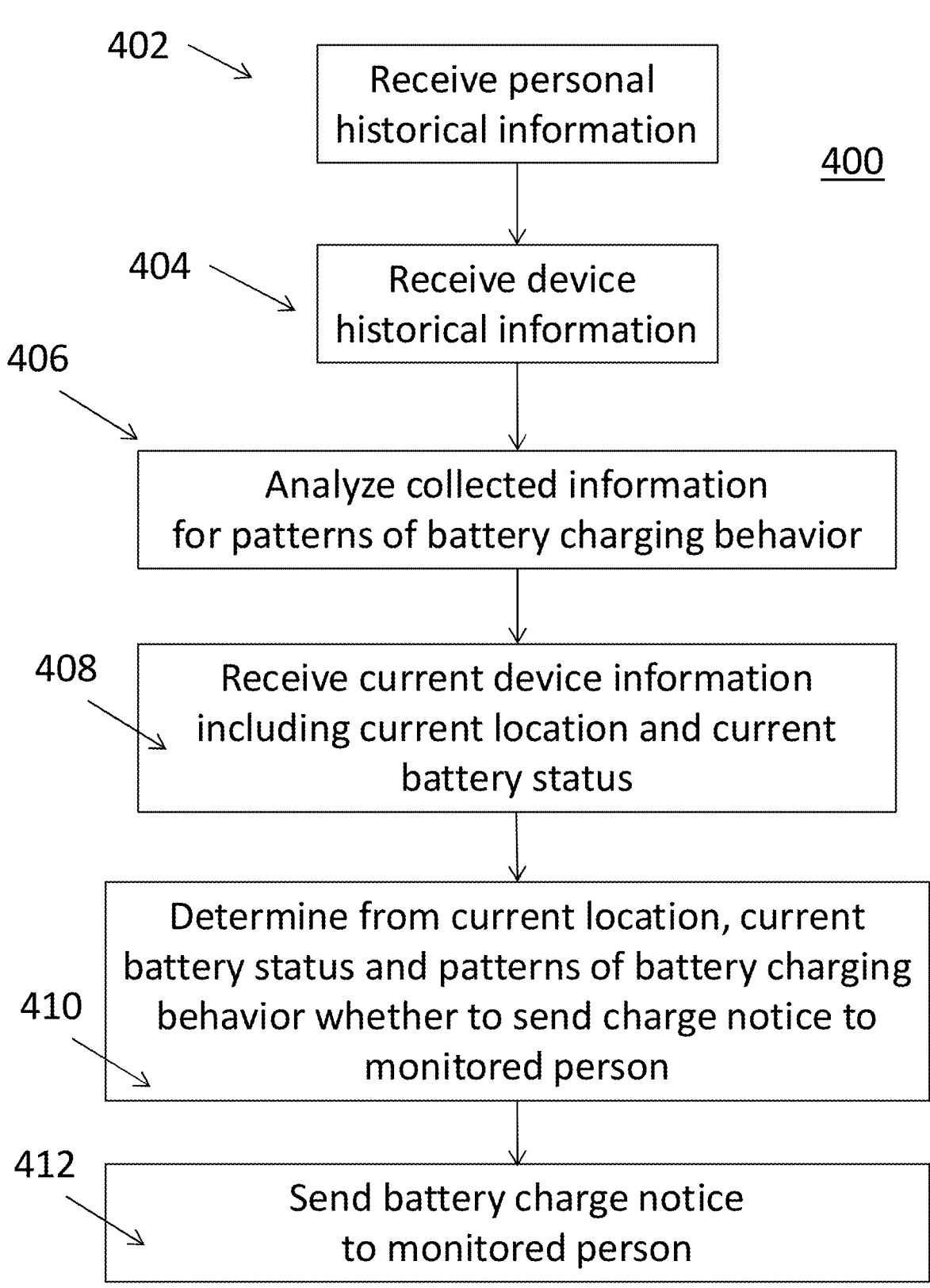

402

Receive personal
historical information

400

404

Receive device
historical information

406

Analyze collected information
for patterns of battery charging behavior

408

Receive current device information
including current location and current
battery status

410

Determine from current location, current
battery status and patterns of battery charging
behavior whether to send charge notice to
monitored person

412

Send battery charge notice
to monitored person

Fig. 4

502 → Identify area suffering power outage

500

504 → Receive device historical information

506 → Cross reference battery violations with identified power outages

508 → Act in response to cross reference

602 Identify area suffering power outage

600

604 Receive current device information

606 Analyze ability to comply with program

608 Act in response to analysis

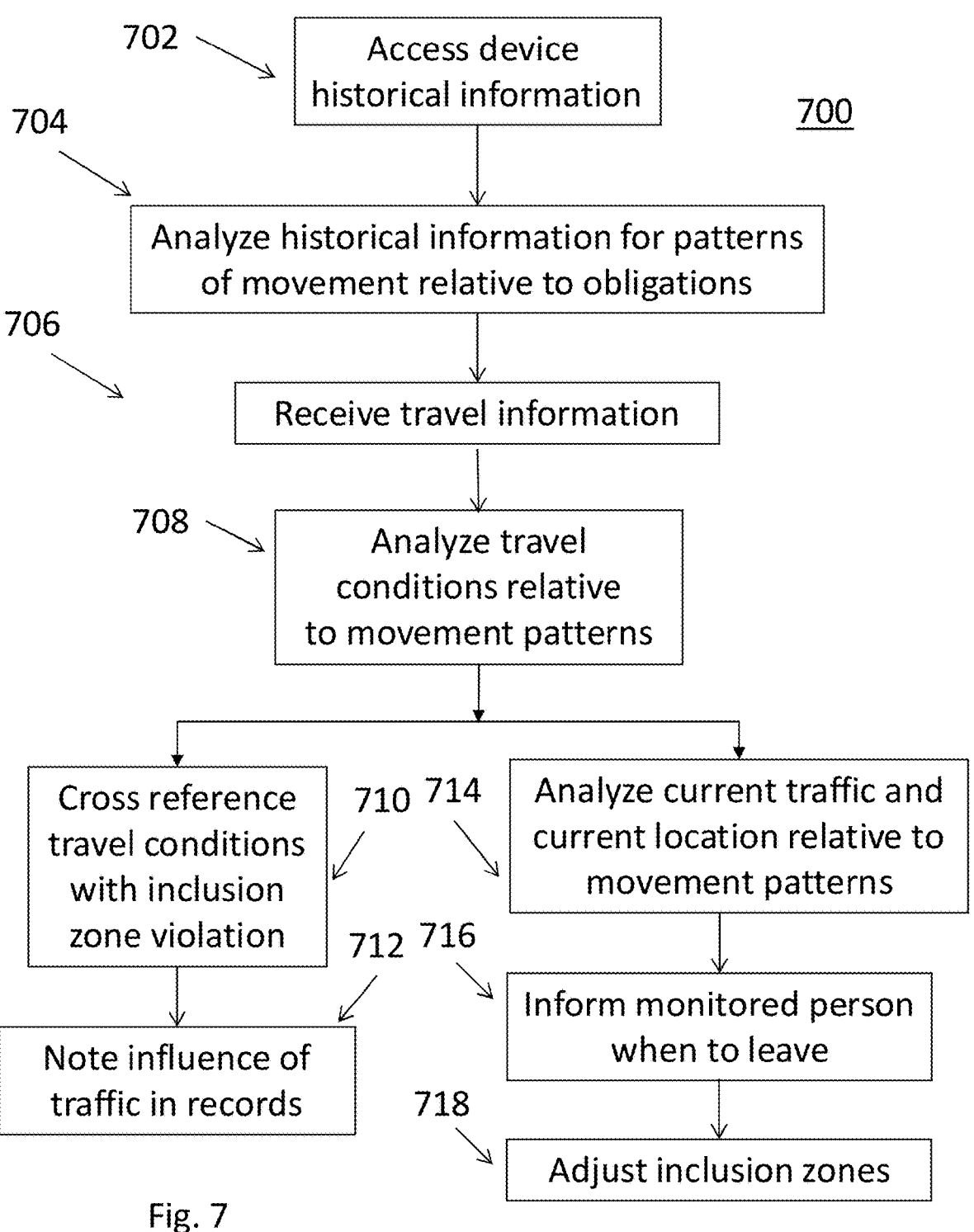

702

Access device
historical information

704

700

Analyze historical information for patterns
of movement relative to obligations

706

Receive travel information

708

Analyze travel
conditions relative
to movement patterns

Cross reference
travel conditions
with inclusion
zone violation 710  714

Analyze current traffic and
current location relative to
movement patterns 712  716

Note influence of
traffic in records

Inform monitored person
when to leave

718

Adjust inclusion zones

Identify monitored persons
that require advanced tracking

804

Analyze patterns of authorized
person's movement and portal usage

806

Predict when authorized person will
be proximate to web portal

808

Notify authorized person
to use web portal

1100

Memory
1104

Network
Interface
Component
1108

Processor
1102

Display
1106

Input Device
1112

PREDICTIVE ANALYSIS SUPPORT OF REMOTE TRACKING

CROSS-REFERENCE OF THE RELATED APPLICATIONS

This application is a Continuation of U.S. patent application Ser. No. 18/336,164, filed Jun. 16, 2023, entitled "PREDICTIVE ANALYSIS SUPPORT OF REMOTE TRACKING", which is a Continuation of U.S. patent application Ser. No. 17/338,100, filed Jun. 3, 2021, entitled "PREDICTIVE ANALYSIS SUPPORT OF REMOTE TRACKING", the contents of which is expressly incorporated by reference herein in its entirety.

FIELD OF THE INVENTION

Various embodiments described herein relate generally to enhanced tracking of monitored devices. More particularly, various embodiments herein relate to enhanced tracking of monitored devices using machine learning techniques in an effort to favorably affect a positive outcome of a monitored person's completion of a monitoring program.

BACKGROUND

The monitoring of movements of monitored individuals involves a variety of sectors, including parolees and home confinement. The technology has its roots in the home arrest systems of the 1980's, in which a user wearable component-typically a "beacon" anklet that was locked to the monitored individual-would communicate wirelessly with a stationary base unit. The range was limited to a few feet of the radio frequency transmitter and receiver. The base unit included a telephone connection for communicating with the authorities. If the monitored individual left the short range allowed by the equipment, the tag and the base unit would lose contact and the base unit would respond by sending an alert to the authorities. False alarms for minor deviations from the short range and/or an inability to confirm false from actual alarms (if the person was where they were supposed to be when the police arrived to investigate) desensitized the police to such alerts, rendering the technology of limited application to low risk offenders.

A later generation of the technology incorporated GPS and cellular telephone technology in a locked anklet. The device would actively record the location of the monitored individual over time and transmit the data to a central monitoring (e.g., police or parole monitoring services). The central monitoring could store and analyze the data for prohibited movements (e.g., a sex offender near a school) or cross reference the movement data with crime incident data to see if the monitored individual was near the crime at the time of the crime. U.S. Pat. Nos. 5,867,103, 6,160,481, 6,218,945, 6,512,456 and 6,703,936, incorporated herein by reference in their entireties, are each exemplary of such a system. The technology is also used to monitor other individual sectors (e.g., patients, children) and objects (e.g., cars, cargo).

The modern monitoring device includes a GPS receiver that determines location, a memory that stores location data over time to define a movement history, and a cellular modem that communicates the movement history to a central location through the cell network; some of these devices can also monitor for the presence or consumption of narcotics. A common implementation is in the criminal justice system as an alternative to incarceration, and monitored individuals (typically parolees) have tamper resistant devices attached to their leg by a band. For ease of discussion embodiments herein are directed to parolees, although the invention is not so limited.

The ultimate goal of a parolee monitoring program is the successful completion of the program so a former parolee can reintegrate into society as a free citizen. A primary source of failure to complete the program is violations of the program terms that generate various level of alerts that require investigation and/or response by supervising authorities. Non-limiting examples of such violations include tampering with the monitoring device, failing to charge the battery of the monitoring device, entering an exclusion zone, leaving or later arrival to an inclusions zone, consuming prohibited substances, etc. Such violations will be detected by the monitoring device and/or the central monitoring and identified for follow up by authorities (typically the police or parole officers). One or more of these violations can result in the loss of parolee and return to incarceration.

Assessment of the consequences of violations is left to the discretion of the supervising authority, in particular the probation officers overseeing any particular group of parolees. There are a variety of limitations on the effectiveness of that oversight. One such limitation is manpower, as parolee officers may have more parolees that they can reasonably handle; limitations on available time may simply limit the number of issues that they can investigate. Another limitation is individual judgment, in that one parolee officer may view a particular violation as minor while another view the same event as significant (e.g., a parolee arrives one minute late to an inclusion zone, for which one parolee officer could let it slide while another could return the parolee to prison). Yet another limitation is any particular parole officer's threshold to sensitivity to the number of violations, as inundating with alerts can become "numb" to the alerts thereby adversely impacting the success of their EM program as a whole.

Historically platforms that support such tracking are reactive. The platforms issue alerts for violations, and agent deals with these alerts accordingly. Some agents and agencies are better than others with execution of their programs. It also should be noted that other agencies inundated with alerts can become "numb" to the alerts thereby adversely impacting the success of their EM program as a whole.

BRIEF DESCRIPTION OF THE DRAWINGS

Various embodiments in accordance with the present disclosure will be described with reference to the drawings, in which:

FIG. 4 illustrates a flowchart to determine whether a monitored person should charge the battery of their personal monitoring device.

FIG. 7 illustrates a flowchart to determine whether traffic may have contributed to a zone violation.

DETAILED DESCRIPTION

Figure 1:
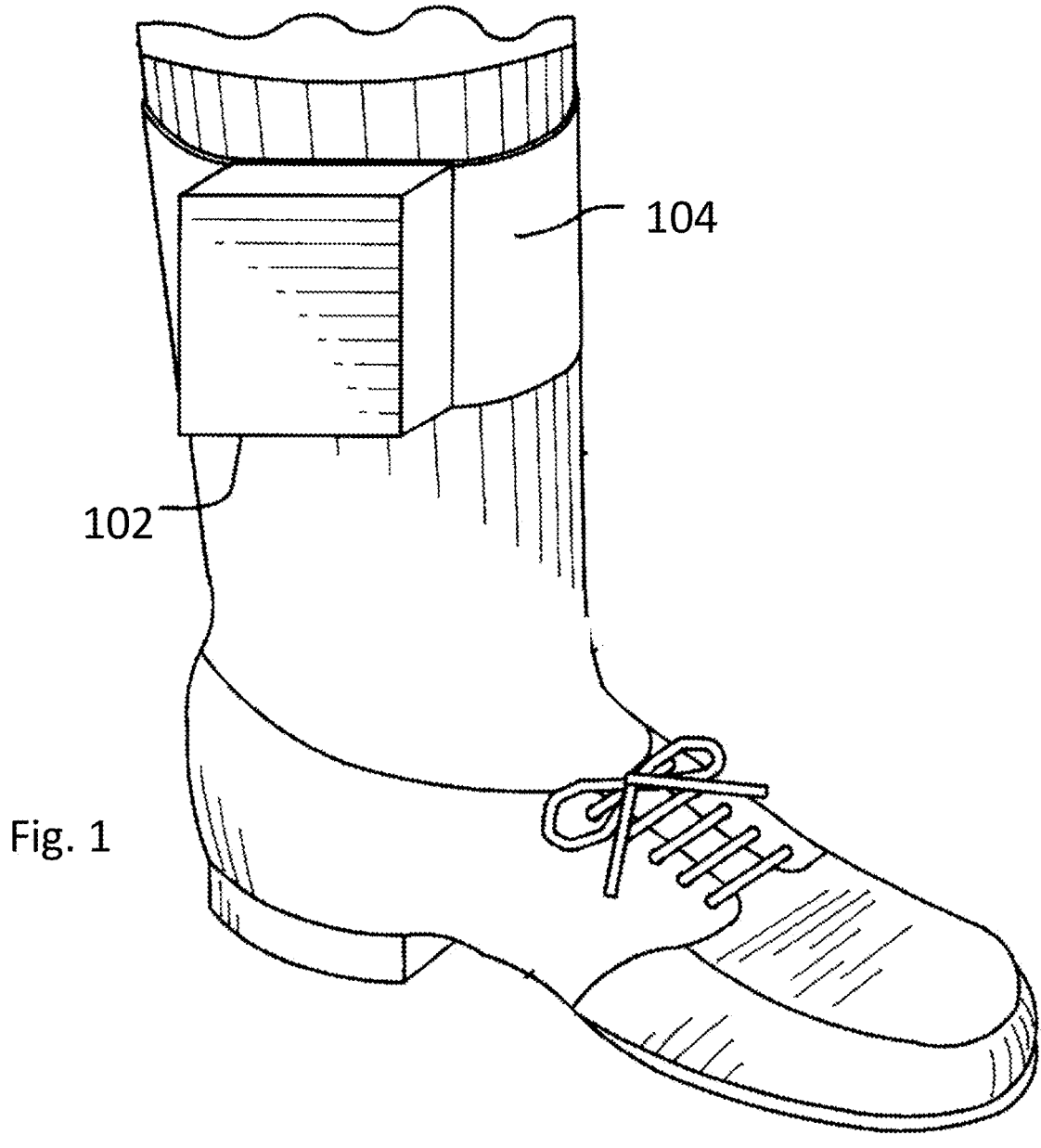
FIG. 1 illustrates an embodiment of a monitoring device attached to an ankle of a user.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. An individual skilled in the relevant art will recognize that other components and configurations may be used without departing from the scope and spirit of the claimed subject matter.

Embodiments of the instant application focus on providing a suite of additional operations in the monitoring devices and central monitoring to improve the likelihood of paroles successfully graduating from the program by reducing the number of violations, or identifying mitigating factors for violations. Other embodiments of the instant application reduce the resource demands on the supervising authority.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like. The term "a" means "one or more" absent express indication that it is limited to the singular. "First," "second," etc. are labels to differentiate like terms from each other, and does not imply any order or numerical limitation.

The phrase "monitored population" refers to a group of individuals and/or objects that have issued monitoring devices and are subject to common electronic location monitoring by an oversight system. The phrases "monitored individual," "monitored person" or the like refers to a particular individual in the monitored population.

An "authorized individual", "supervising authority" or the like would be any one or more people having some type of supervisory responsibility and/or decision making relative to the monitored population or monitored individual therein. By way of non-limiting example, a parole officer would be the authorized individual relative to a parolee. Other non-limiting examples include parent/child, patient/medical supervisor, etc. Security and/or police could be considered a supervising authority relative to a population of monitored individuals to the extent the emergency level intervention is considered necessary. For sake of brevity, discussion herein is confined to parolee/parole officer relationship, although the invention is not so limited. The invention also applies to objects that can be monitored, such as cars or cargo.

In the concept of technologically determining a geographic position of a person or object, the term "location"

refers to the position that the technology identifies the person or object to be, as opposed to the actual physical location of the person or object. Such tracking technologies have some degree of margin of error such that any technologically determined location will not be an exact location of the person or object. For example, under certain conditions GPS has a known margin of error within 1-5 meters, and thus the location determined for a person using GPS under those conditions may differ from their actual position by 1-5 meters. Any such technological determinations of position are thus approximate based on the underlying accuracy of the tracking technology and margin of error. Any use of "location" in the specification or claims is to be considered modified by "approximate" to account for such variation whether expressly stated or not.

"Inclusion zone" refers to a bounded geographic area in which a monitored person is expected to be. An inclusion zone may have an associated time frame, in that the monitored person is expected to be within that inclusion zone during specific hours (e.g., at home from 12 AM-7 PM, at work from 9 AM-5 PM). As used herein, references to locations in which the monitored person is expected to be such as "work", "home" or the like refer to inclusion zones.

"Inclusion zone violation" refers to the monitored device identifying the location of the parolee as outside an inclusion zone during a time frame in which the parolee is expected to be within the inclusion zone.

"Exclusion zone" refers to a bounded geographic area in which a monitored person may not enter. An exclusion zone may have an associated time frame, in that the monitored person may not enter an exclusion zone during specific hours (e.g., a school from 7 AM-5 PM). As used herein, references to locations in which the monitored person is excluded from such as "school", "bar" or the like refer to exclusion zones.

"Exclusion zone violation" refers to the monitored device identifying the location of the parolee as inside an exclusion zone during a time frame in which the parolee is expected to be outsize the exclusion zone.

"Battery violation" refers to a threshold level of battery charge that the parolee must maintain to comply with the monitoring program, such that depletion of the battery charge below that level violates the program.

Tracking Devices

FIG. 1 shows a block diagram of a personal monitoring device 102 according to an embodiment of the invention. Personal monitoring device 102 can determine its location, such as through the Global Positioning Satellite, cell towers, LORAN, wireless local access points, or other known methodologies; for sake of brevity discussion herein is confined to GPS, although the invention is not so limited. Monitoring device 102 is shown as a one-piece unit, although multiple pieces as known in the art could also be used.

A band 104 secures monitoring device 102 to a limb of the user, typically the ankle, via a locking mechanism that preferably can only be (legally) opened by an authorized individual. An ankle is shown in FIG. 1, although the invention is not limited thereto. Monitoring device 102 and band 104 preferably have tamper detection capabilities as is known in the art and not discussed further herein. The invention is not limited to any particular securing and/or tamper detection methodology.

Figure 2:
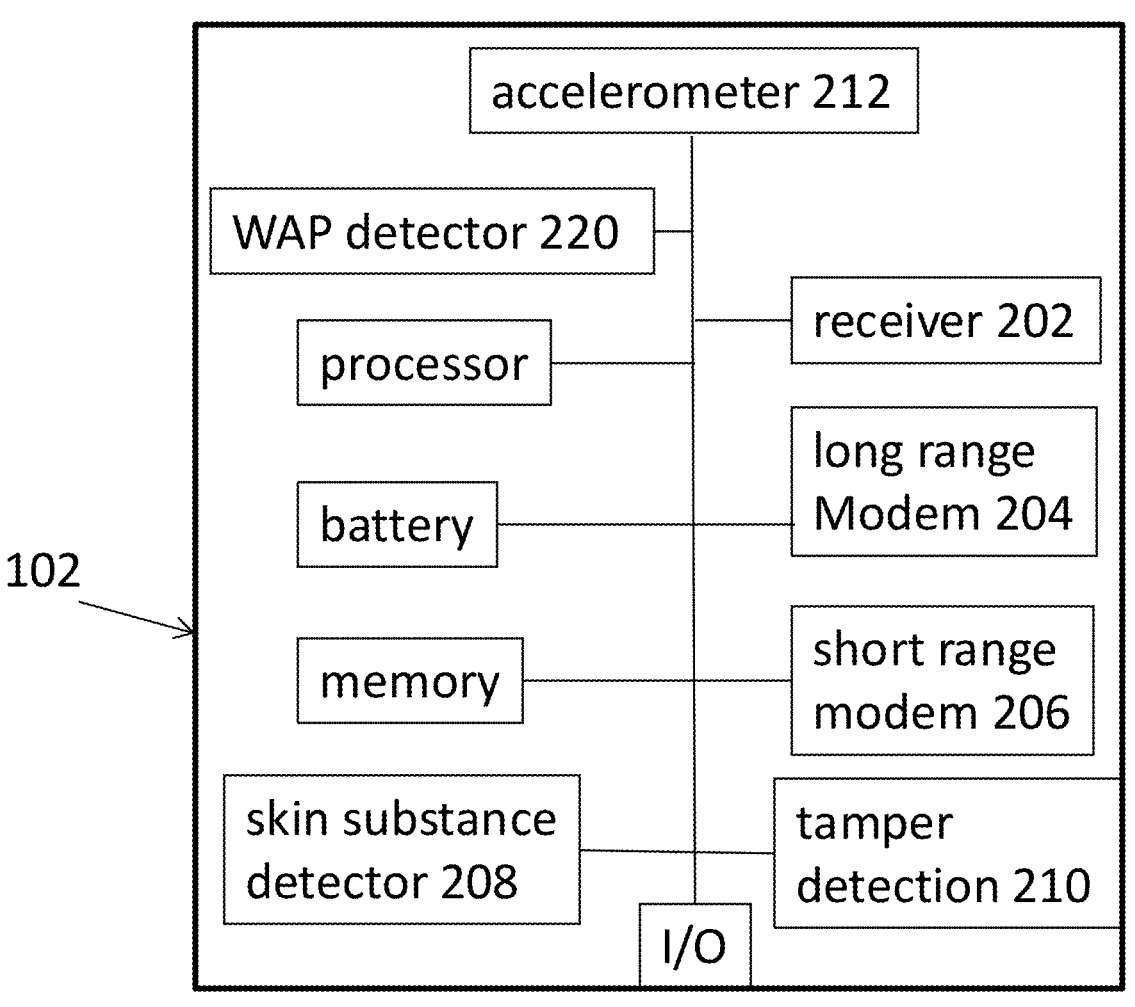
FIG. 2 illustrates an embodiment of the internal components of the monitoring device of FIG. 1.

Referring now to FIG. 2, a non-limiting example of monitoring device 102 includes a dedicated circuit with hardware and/or software for determining its location, such as a GPS receiver 202. A cellular/long range modem 204 preferably provided with a SIM card allows the monitoring device 102 to communicate through the cellular network with a central monitoring 310 (FIG. 3) and/or an authorized person 312. A short range modem 206 (e.g., 915 MHz or 802.11 compatible Wi-Fi or Bluetooth) allows the monitoring device 102 to communicate locally with other wireless devices within the short range as is known in the art for such devices. Modems 204 and 206 may be the same modem operable to communicate on different frequencies. A substance detector 208 may be provided to monitor the presence of prohibited substances in the monitored individual, such as through a sensor in contact with the skin; the configuration of substance detectors within a portable monitored device is known by those of skill in the art and not further discussed herein. Tamper detection mechanism 210 monitors for tamper detection as is known in the art. An accelerometer 212 may measure speed of movement.

Monitoring device 102 may also include a wireless access point detector 220 that detects short range (e.g., maximum range on order of less than hundreds of feet) wireless access points (or "WAP") within range and records information about the detected wireless access points in the memory. By way of non-limiting example, wireless access points may be IEEE 802.11 compatible Wi-Fi hotspots that provide Internet access to network devices as are commonly known in the art of mobile phones and tablets, and the wireless access point detector 220 may be an IEEE 802.11 compatible Wi-Fi finder. In another non-limiting example, devices that communicate via Bluetooth could be wireless access points. A cellular tower is a long range point of access (maximum range on the order of miles) and would not be a short range wireless access point as understood herein.

Batteries, a power port, memory, I/O interface, wired communication access and other supporting computer hardware and software as is known in the art are also preferably provided and not discussed further herein. Monitoring device 102 may be integrated into a single unit or multiple units as is known in the art. The invention is not limited to the details of the architecture of monitoring device 102.

The discussion herein primarily focuses on GPS signals and equipment for location purposes, although the invention is not so limited and other forms of location can be used. Non-limiting examples include GLONASS, Galileo, and GAGAN. Combinations of different location methodologies could also be used. The invention is not limited to the type of location methodology.

The discussion herein primarily focuses on Wi-Fi or Bluetooth signals and equipment for short range communications, although the invention is not so limited and other forms of short-range communication can be used. Non-limiting examples include LiFi, ZigBee, and induction wireless. Combinations of different short-range methodologies could also be used. The invention is not limited to the type of short-range communications.

The discussion herein primarily focuses on cellular and equipment for long range communications, although the invention is not so limited and other forms of long-range communication can be used. A non-limiting example is LoRa. Combinations of different location methodologies could also be used. The invention is not limited to the type of long-range communications.

Figure 3:
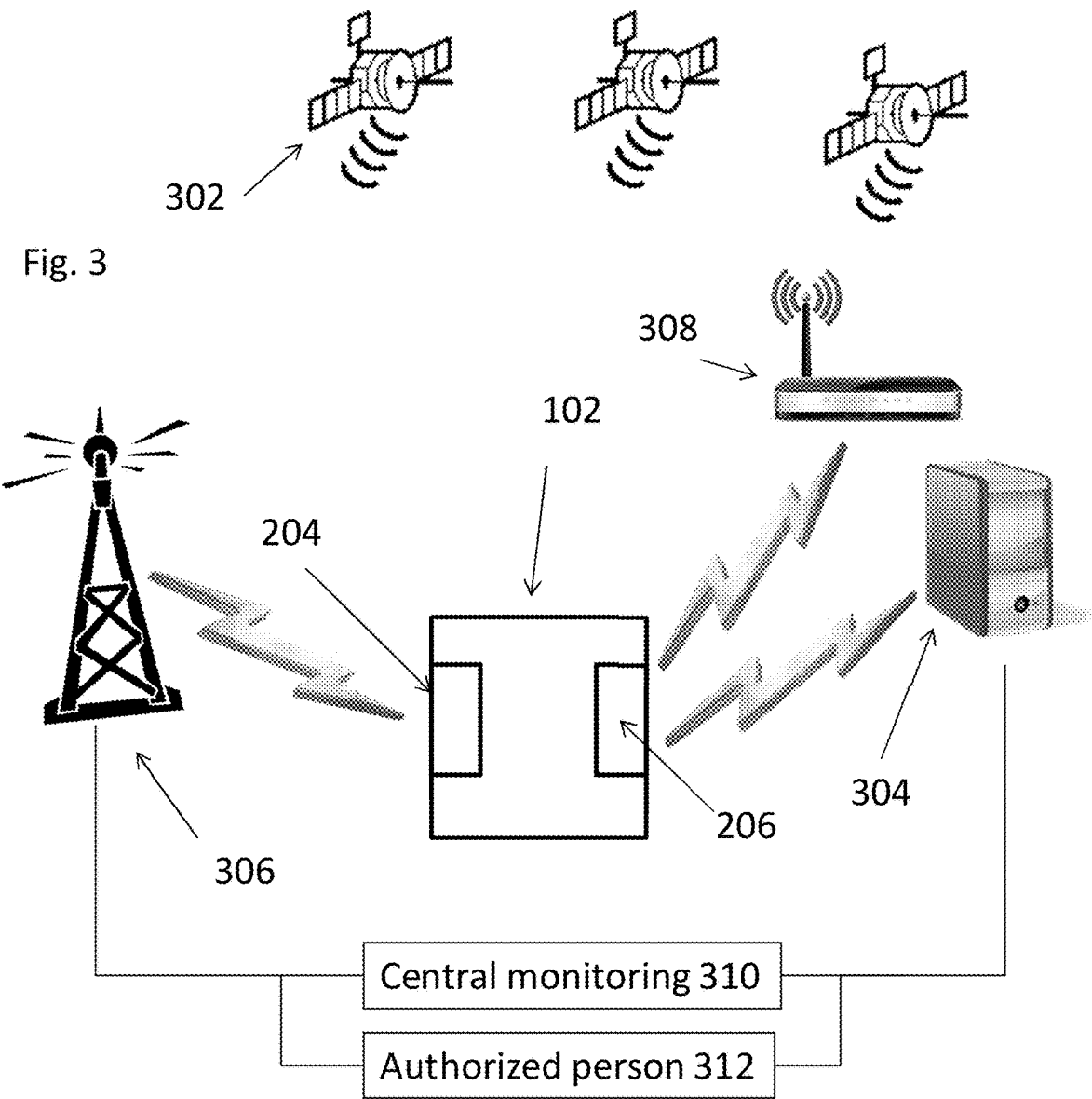
FIG. 3 illustrates an operating environment of the monitoring device of FIG. 1.

Referring now to FIG. 3, monitoring device 102 is shown in an operating environment. Multiple satellites 302 provide the GPS timestamps that GPS receiver 202 in monitoring device 102 converts into location information. The location information represents the approximate position of the monitoring device 102, and by extension the approximate position for the monitored individual, at a particular time.

Monitoring device 102 can transmit that information as location data in near real time, and/or can store the location information as location data in memory and batch transfer collected location data as dictated by the need of the system (e.g., on a fixed and/or random schedule, or in response to an event or specific instruction to do so). If substance detection capability is present, then information relating to screening(s) may be similarly stored, transmitted in near real time or batch transmitted collectively, either with or separately from the location data.

Monitoring device 102 preferably has at least two options for remote communications, including data transfer. The first is through the short-range modem 206 with a trusted home monitoring device 304 when within the range (e.g., <300 feet, more particularly about 50-100 feet) of the short-range modem 206. The second is through the cellular/long range modem 204 (potentially miles) to a cell tower 306 when the monitoring device is out of range of the trusted home monitoring device 304. A third option is short range modem 206 with a wireless access point 308. Preferably cell tower 306, wireless access point 308 and/or trusted home monitoring device 304 connect to central monitoring 310 and/or an authorized person 312, whether directly or through intervening equipment (e.g. cell network, Internet) as known in the art.

Wireless access point detector 220 is shown in FIG. 2 as separate from modems 204 and 206, but may be part of those modems or other components. By way of non-limiting example, modem 204 could be a cellular modem, modem 206 could be a separate RF modem, and wireless access point detector 220 could be a distinct Wi-Fi modem and/or Wi-Fi finder component. In yet another example, modem 206 is a Wi-Fi network adaptor that includes Wi-Fi finder hardware and/or software, such that the wireless access point detector 220 is part of modem 206. In still yet another example, modem 204 could be a cellular modem, modem 206 could be a separate RF modem, and wireless access point detector 220 could be a distinct Wi-Fi network adaptor. The invention is not limited to the particular organization or components that define the wireless access point detector 220.

Central monitoring 310 is "central" in the sense that it serves one or more monitoring devices 102. It may be a single location, multiple locations operating independently, or a distributed arrangement. At a most basic level the central monitoring 310 is no more than a computer (e.g., a server) having a memory, processor, modem, input/output, and other supporting computer hardware and software as is known in the art, although in practice they may be large facilities with distributed computers and human handlers. Functionality attributed herein to central monitoring 310 is preferably implemented by software programmed onto electronic computer hardware. The invention is not limited to the architecture or layout of the central monitoring 310.

Predictive Engine

Figure 8:
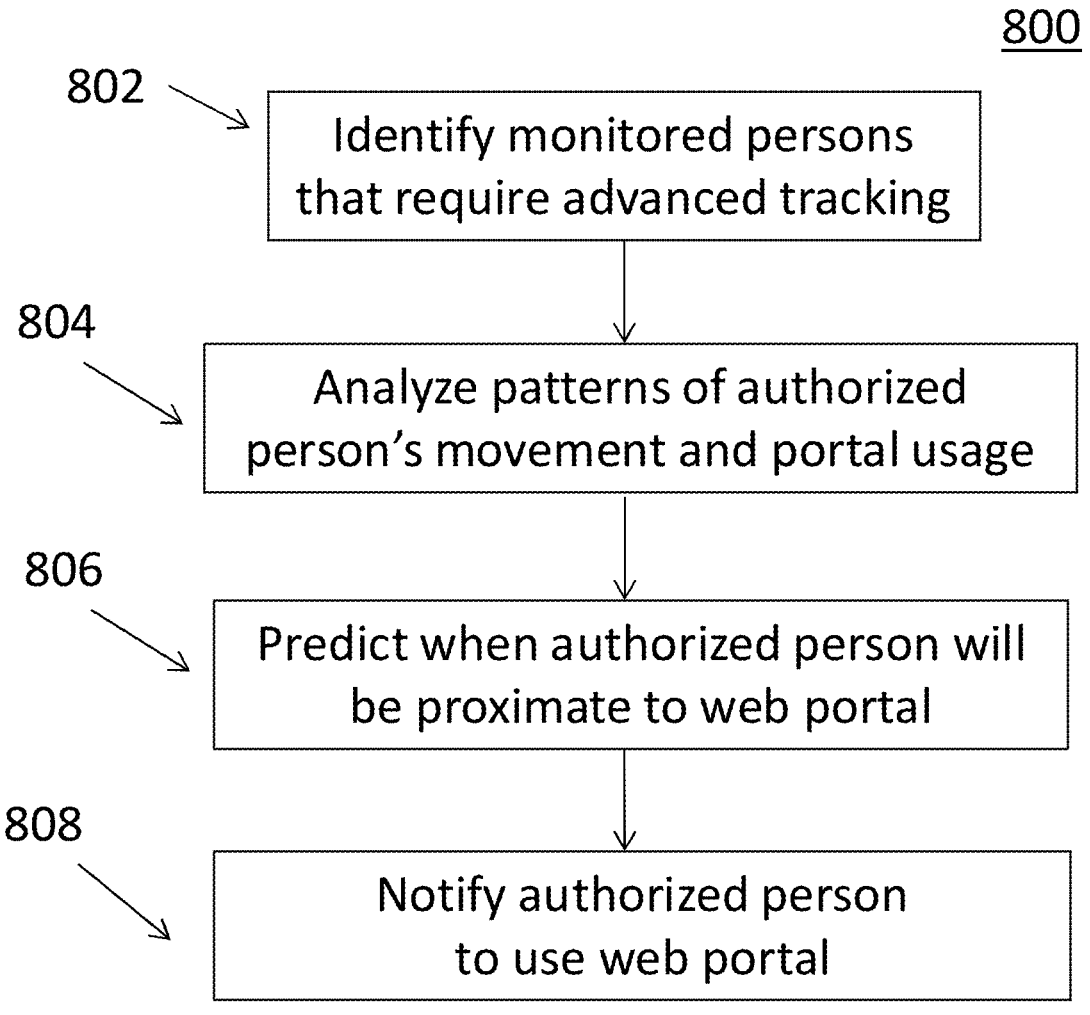
FIG. 8 illustrates a flowchart to direct a mobile user of a tracking app to switch to the desktop version.

As noted above, embodiments of the invention are directed to a suite of tools that can improve the ability of parolees to graduate from the monitoring program. Such tools may be based on a "generic" individual, in that the tools operate on the basis that all individuals are equal and are treated the same way. Referring now to FIG. 8, operations can be fine-tuned or tailored to particular individuals via a predictive engine 900 may be used to generate predictions on how a specific individual may act under certain circumstances. Such considerations may be based on specific past behavior of the individual, past behaviors of similar classes of individuals, or both. Predictive engine 900 is a combination of electronic computer hardware programmed with software as described in more detail below.

Figure 9:
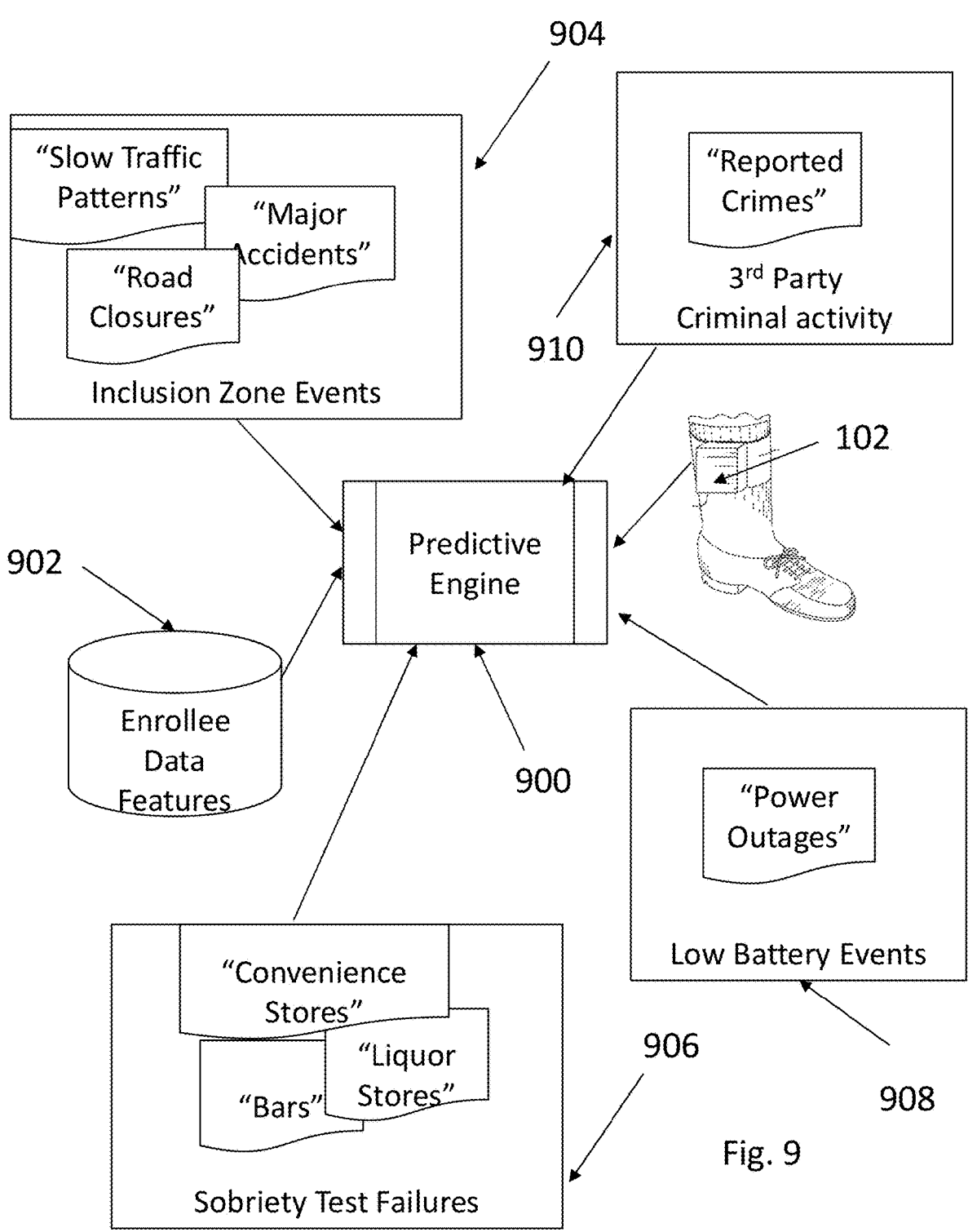
FIG. 9 illustrates a prediction engine and various sources of information for the prediction engine.

FIG. 9 shows a non-limiting example of potential sources of information for the predictive engine. Enrollees data features 902 represents the characteristics for each monitored person in the monitored population, such as race, age, gender, weight, height, home address, work address, prior criminal history, prior status as a parolee, prior violations in the program, and/or the effect of prior reminders in the program. This information may be obtained when the monitored person enters the monitored program and/or be updated over time (e.g., they age, move, change jobs, experience violations, etc.).

Data regarding the monitoring devices 102 of the monitored population may also be used. This could be the raw information from the monitoring devices 102, or from subsequent analysis as provided directly by the central monitoring 310. Non-limiting examples of raw information include battery charge, location, and accelerometer data. Non-limiting examples of processed data may include battery violations, overall battery health (whether monitoring device 102 is holding its charge), inclusion zone violations, and/or exclusion zone violations.

Relevant information may also include geo-time spatial events regarding behavior of the monitored person and the surrounding environment. By way of non-limiting example for a monitored person, the location data may show that the monitored person attends church services, Alcoholics Anonymous meetings, or classroom education (e.g., college class, trade school). By way of non-limiting example for a surrounding environment, an area around the monitored person's home or work may be a high crime or low crime area as reflected by recorded crimes at specific times and locations.

Relevant information may also be obtained from external sources not directly related to the tracking architecture.

For example, if traffic prevents a monitored person from reaching an inclusion zone at a designated time, independent sources of traffic information 904 (e.g., GOOGLE MAPS) may provide relevant information to assess fault for the violations. Similarly, if road closures redirect traffic out of an inclusion zone and/or into an exclusion zone, then sources of such traffic information 904 may provide relevant information to assess fault for the violation.

Another source of information 906 may be the location of establishments that sell liquor, such as bars and liquor stores. To the extent that monitored persons are prohibited from purchasing or consuming alcohol, the known location of such establishments from source of information 906 may be relevant for predictive engine 900. To the extent that it is available, open hours of such establishments may also be of value, as proximity of a monitored person to such an establishment when it is closed is not likely to constitute improper activity.

Yet another source of information 908 is the availability of utility power, and corresponding location and time of any power outages. Such information may be relevant if the absence of utility power was responsible for a battery violation because the monitored person could not charge their monitoring device 102.

Yet another source of information 910 is the criminal activity in the area of the monitored person, such information being provided by the authorities 312 or from central monitoring 310. While the monitored person may have no direct relation to any specific criminal activity, the fact that the monitored person is proximate to a high crime rate area as opposed to a low crime rate area may be a contributing factor to successful completion of the program.

The above sources of information are only non-limiting examples. Other sources and combinations of source can also be used based on what is available and desirable.

Figure 10:
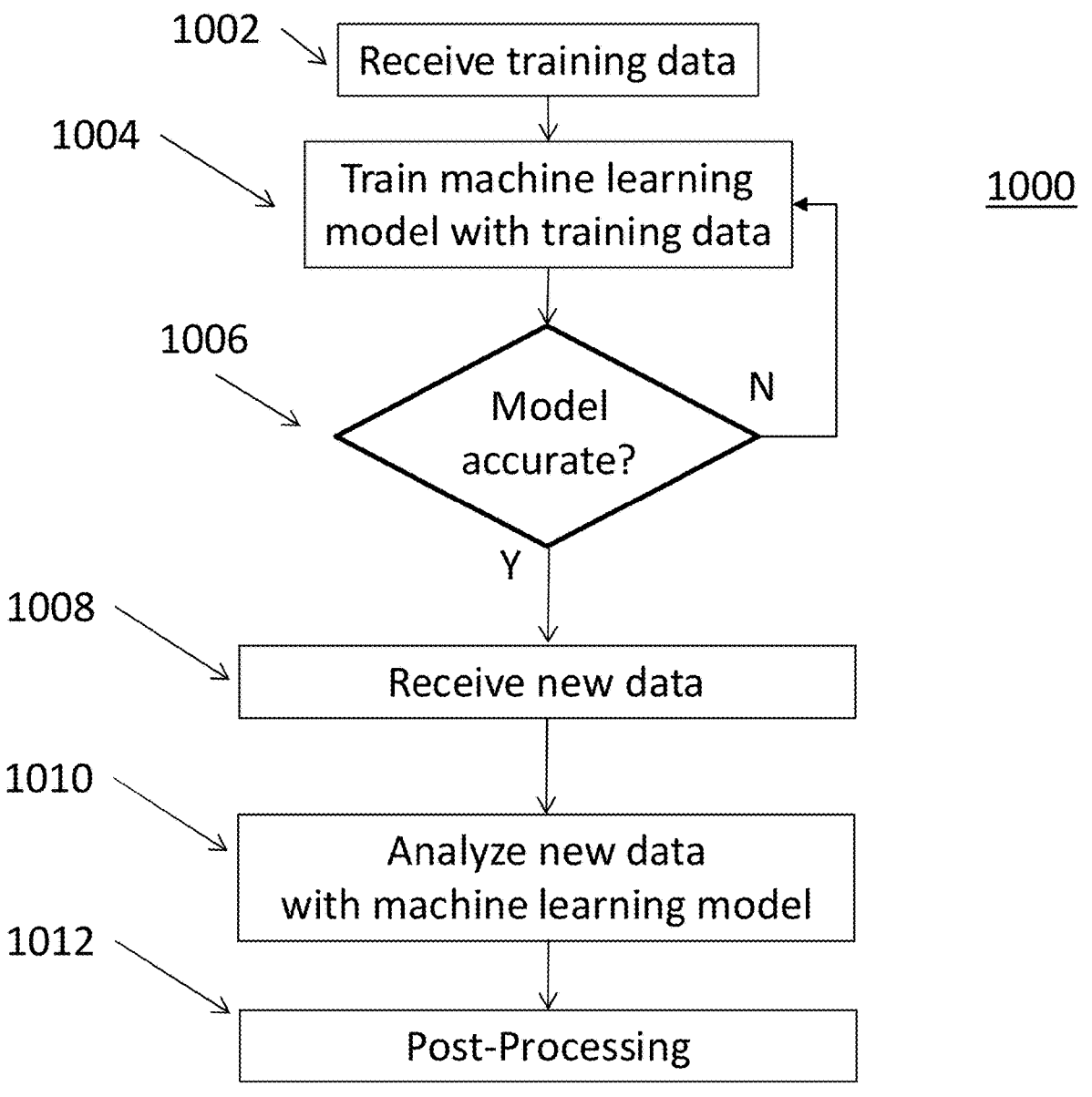
FIG. 10 illustrates a flowchart of machine learning that may be used in the prediction engine

Predictive engine 900 may operate using machine learning principles, and particularly by considering how different combinations of factors improve or detract from successful program compliance. Referring now to FIG. 10, a flowchart 1000 of an example of a process for generating and using a machine-learning model according to some aspects.

In block 1002, training data is received. In at least some embodiments herein, training data may include personal characteristics of the monitored population (e.g., characteristics for each monitored person in the monitored population, such as race, age, gender, weight, height, home address, work address, prior criminal history, prior status as a parolee, prior violations in the program, and/or the effect of prior reminders in the program), prior behaviors, movement data, battery charging history, violation history, etc. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1004, a machine-learning model is trained using the training data. In at least some embodiments herein, the machine-learning model can be trained in a supervised manner, in which each input in the training data is correlated to a particular output. This particular output may be a scalar, a vector, or a different type of data structure such as text or an image. This may enable the machine-learning model to learn a mapping between the inputs and desired outputs. However, the invention is not so limited, and training may be unsupervised (the training data includes inputs, but not particular outputs, so that the machine-learning model has to find structure in the inputs on its own) or semi-supervised training (only some of the inputs in the training data are correlated to particular outputs).

In block 1006, the machine-learning model is evaluated for accuracy. For example, an evaluation dataset can be obtained, for example, via user input or from a database. The evaluation dataset can include inputs correlated to desired outputs. The inputs can be provided to the machine-learning model, and the outputs from the machine-learning model can be compared to the desired outputs. In at least some embodiments, the outputs of the predicted activity of portions of the monitored population could be compared with the actual activity of portions of the monitored population.

If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1004, where the machine-learning model can be further trained using additional training data or otherwise modified to improve accuracy. If the machine-learning model has an adequate degree of accuracy for the particular task, the process can continue to block 1008.

Steps 1002-1006 may loop, in that the methodology may receive new training data over time and repeatedly update the model to account for new training data.

In block 1008, new data is received. In some examples, the new data is received from a remote database or a local database, constructed from various subsets of data, or input by a user. The new data may be unknown to the machine-learning model. For example, the machine-learning model may not have previously processed or analyzed the new data. In at least some embodiments herein, new data may be, for a current location of a personal monitoring device 102, current battery charge, current availability of utility power, and/or current traffic conditions.

In block 1010, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1012, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Monitoring systems typically work on a "stick" mentality, in that enrollee compliance is based on fear of punishment for program violations. While embodiments herein can be similarly used, they can be used for a "carrot" approach of rewards for successful compliance with the program. Predictive engine 900 can be particularly valuable for the latter, for just as it can predict actions that (historically) lead to failure, it can also predict actions that can lead to success.

Battery Charging

A particular aspect of GPS monitoring that contributes to parolee failure is not consistently charging the battery of monitoring device 102. If the battery charge falls below a particular level then the monitoring device 102 will be unable to track the monitored person. Therefore under most parolee requirements it is the parolee's responsibility to keep the battery of monitored device 102 charged above a certain power level, and it is a program violation if they fail to do so. Dealing with a resulting battery violation places yet another burden on a parolee officer or other supervisory agent and can contribute to the parolee being removed from the program and returned to incarceration.

With current technology, it requires about one hour every day to maintain a consistent battery charge for monitoring device 102. Since monitoring device 102 is locked onto a limb of the monitored individual, the battery charging requirement essentially requires that the monitored individual remain tethered to a wall outlet or other suitable power source for one hour a day. The tethering may be physical, such as physical cord or proximity via induction charging. The tethering may also be data range, such as for a two-piece monitoring device with a cuff locked onto a monitored person and the tracking components connected to the wall outlet such that the cuff must remain within a range of communication between the cuff and tracking components.

While maintaining an appropriate charging schedule and/or responding to battery warnings would seem easily doable in theory, as a practical matter there are frequent breakdowns. This is observable daily within the general population by the sheer number of people whose phones die because they forget to charge them.

In the prior art there are a variety of methods to remind the parolee to charge their monitored device 102. A basic approach is a low and/or critical battery warning alert from the device itself. Another approach is for monitoring device 102 to report its battery status to central monitoring 310 and/or authorized person 312, which/who sends a reminder to the parolee to charge monitoring device 102. Yet another approach is a basic daily alarm reminder for a set time.

Such prior art approaches are of limited effectiveness because the monitored person may not be in a situation in which charging is available or a viable option. For example, if the parolee is about to travel from home to a parole officer meeting and receives a low battery warning, then the parolee is placed in Catch-22 of either a battery violation for their battery dying on their way to the meeting, or a meeting violation for staying at home to charge their battery.

An embodiment of the invention provides a more intelligent system of monitoring parolee activity and tailoring charging instructions based on that prior activity relative to current events. This process will identify optimal opportunities for the parolee to charge their device and send corresponding reminders for the same. This process will decrease the number of battery violations with a corresponding decrease in burden on the supervising authority, all while increasing the probability that the parole will successfully complete their program.

Referring now to FIG. 4 flowchart 400 shows a non-limiting example of this methodology. FIG. 4 is generally directed to the accumulation of information to identify the most optimal times for charging monitoring device 102. At step 402, personal historical information for a monitored person is collected. As discussed in more detail below, such personal information may be used in a predictive analysis process to further enhance selection of the optimum time for charging.

At step 404, device historical information for the monitored person's personal monitoring device 102 is collected. As is known in the art, such historical information may include movement data that reflects the approximate location of the monitored individual over time. The information may also include past battery status information. Battery status information could include when the battery was last charged, the amount of remaining charge at particular times, low battery conditions, and/or critical battery conditions. Step 402 and 404 may occur separately or concurrently.

At step 406, central monitoring 310 and/or monitoring device 102 analyze the collected information from steps 402 and 404 to identify patterns of behavior as it pertains to charging the battery of monitoring device 102. By way of non-limiting example, the system may determine that the monitored person has a high success rate (e.g., the battery is consistently properly charged) when the monitored person is home and charges their device between 8-10 PM in the evening. In contrast, there may be a lower success rate (e.g., low and/or critical battery warning levels) when the monitored person may have a lower success rate when they are at another location from 8-10 PM, or if they are at home but charge after midnight (e.g., the plug the monitoring device 102 into a wall outlet charge, but fall asleep and pull the cord from the wall). The analysis may go to a deeper level, such as determining that the monitored person tends to be home Monday thru Friday and reliably charges between 8-10 PM, but the monitored person tends to be elsewhere on Saturday and Sunday without reliably charging such that violations are more likely to occur.

At step 408, current information is received from personal monitoring device 102. Such current information may include location information and battery status information. At step 410, central monitoring 310 analyzes current information relative to the determined patterns from 406 to determine at step 412 whether to send the monitored person an instruction to charge their battery. This analysis looks at the person's current location and battery status relative to the patterns of behavior to identify potential for successful and unsuccessful outcomes and reacts accordingly.

By way of non-limiting example, the pattern of behavior from step 406 shows successful charging between 8-10 PM when the monitored person is at home. If the person is at home during that time, then the current information from monitored device 102 at step 408 will reflect this. Step 410 thus considers the location from the current information relative to the pattern of behavior and determines that the monitored person is at a location where they are successfully charged before and thus avoided battery violations in the past. The system can react to send, or not send, a reminder at step 412 to keep the monitored person on pace.

For example, either by successful pattern and/or reliance on the historical information, the system determines that it would increase or maintain compliance for the monitored person by sending a reminder at 8 PM when they are at home. In another example, the system may elect not to send a reminder at 8 PM when at home as the historical information indicates that the monitored person is reliable ("over" notification can desensitize the monitored person), but may instead send one at 9 PM if the battery status at that time indicates that the monitored person has not charged per normal patterns.

In another example, a "carrot" approach is used. If the pattern of behavior shows successful charging between 8-10 PM when the monitored person is at home, then the methodology may determine that it would increase or maintain compliance for the monitored person to send a post-charging notice at 10 PM with a positive affirmation (e.g., a text with "Good job!"). This could be in addition to, or an alternative to, the reminder at 8 PM.

Such decision making at to what messages to send, and when, could lie with predictive engine 900, which would determine whatever action facilitates the highest likelihood of successful program compliance. Based on the history and current circumstances of any particular enrollee, Enrollee A may benefit most from a reminder, Enrollee B may benefit most from a positive affirmation, and Enrollee C may benefit most from both.

As noted above, current information from the monitoring device 102 factors into the methodology by providing current location. For example, patterns of behavior may indicate that a user is expected to be home 8-10 PM and make determinations when the user is at that location at that time. However, monitored persons may not always follow predicted behavior. If the current information shows that the user is not yet at home, then sending a reminder at that time will be of limited value because the user may not be in a location to react to it. The methodology could then take other action, such as deferring the reminder until the monitored person returns home as shown by (then) current information from the monitoring device 102. The methodology may also determine that while the user is in a different location, historical information shows prior successful charging at that location at the same time and send a reminder on that basis.

In another example, the historical information indicates that the monitored person reliably charges from Monday to Friday at 8-10 PM when they are home, but not on Saturday or Sunday when they are elsewhere. Reminders for Monday-Friday may be sent as above, but those same reminders may not be effective on Saturday or Sunday. In such cases, the methodology may identify other opportunities for charging. For example, there may be historical information that shows successful charging at a particular location that the monitored individual is currently at. Even though it may only be earlier in the day and/or the battery still has a substantial charge, the system may nonetheless decide to send a reminder at step 412 because the opportunity to charge is currently available and patterns of behavior indicate a potential future charging violation unless the monitored person uses this opportunity to charge.

Battery charge level may be a considered factor in determining how the system should react. For example, the battery may already be near fully charged such that charging at this time is simply not necessary, and sending a reminder may be an over notification. In another example, a monitored person unexpectedly reaches full charge in the morning at 9:30 AM, such that no further charge is needed that day, for which even if the monitored person is home during 8-10 PM the system does not send the customary reminder.

Analysis at 410 may also include identifying indicia of failing battery health. As is known in the art, over time batteries degrade and lose their ability to hold charge. Typically this occurs after an expected period of time and is addressed during scheduled maintenance of monitoring device 102. However, sometimes a battery may be defective, damaged, or just degrade faster than expected. In such circumstances, the battery may need to charge more often, and the methodology can accordingly tailor its reminders at 412 to account for the same. The reminder may be, or include, an instruction for the monitored person to contact the authorities to repair or replace the battery. The failing battery status can also be considered a mitigating or neutralizing factor for any battery violation.

In yet another example, the monitored person may be at a location with historical records of successful battery charge and the current battery charge may currently be adequate for at least short term use, yet the predicted patterns of movement indicate that the person will leave that location for a period of time and the battery would die out during that period. For example, the patterns may show that the monitored person charges successfully at home, but not at work. If the monitored person is at home with a partially charged battery and needs to leave for work, the battery may run out while the monitored person is at work. From at least the current battery charge, the movement history, inclusions zones, and/or the battery charge history, the methodology predicts at 410 that absent additional charge the battery will fall below a minimum threshold at a time when the user has a poor track record of battery charging. While the battery has sufficient charge at the moment, the methodology nonetheless sends a battery charge reminder notification at 412 to allow the monitored person to avail themselves of power at the current location and avoid a future battery violation.

The above analysis may consider the personal historical information via machine learning techniques that study patterns of behavior based on the monitored population, which may change the reminder protocol for otherwise similar monitored individuals. The monitored person has personal characteristics (examples discussed above) that are common with other members of the monitored population. By way of non-limiting example, a common characteristic is female gender, and personal historical information for the monitored persons may show that women are more reliable than men in charging, such that reminders to women do not tend to improve compliance whereas reminders to men do tend improve compliance. The consideration may also be personal, in that historical records may show that reminders actually help the monitored person (e.g., they begin to charge shortly after receiving the reminder) or do not (not meaningful change in behavior). Personal historical information also includes past violations, and if the monitored person is acting consistently with the reminders and there are no violations, it may reduce or completely phase out the reminders. Likewise, it can resume or increase the reminders if the violations increase or reoccur.

The above concepts of reliability, success and the like represent predefined parameters as set by the system administrator. By way of non-limiting example, battery charging at a location may be considered successful only if there has never been a battery violation while at that location. In another example, success may allow for one violation per week. Probabilities relative to action are also predetermined. By way of non-limiting example, the methodology may establish that a notification should be sent if there is a 20% or greater chance of a potential battery violation. The invention is not limited to what predefined parameters establish these concepts.

Power Outages

Other embodiments relate to monitoring and accounting for power outages in battery charging behavior. It can be difficult if not impossible for a monitored person to charge monitoring device 120 during a power outage. As it is the responsibility of the monitored person to maintain an appropriate battery charge for monitored device 102, but some jurisdictions may elect not to fault the monitored person if power was not available to charge the battery. Accounting for the impact of power outages can therefore eliminate or at least reduce the severity of battery charge violations, thereby improving prospects for successful completion of the program.

Figure 5:
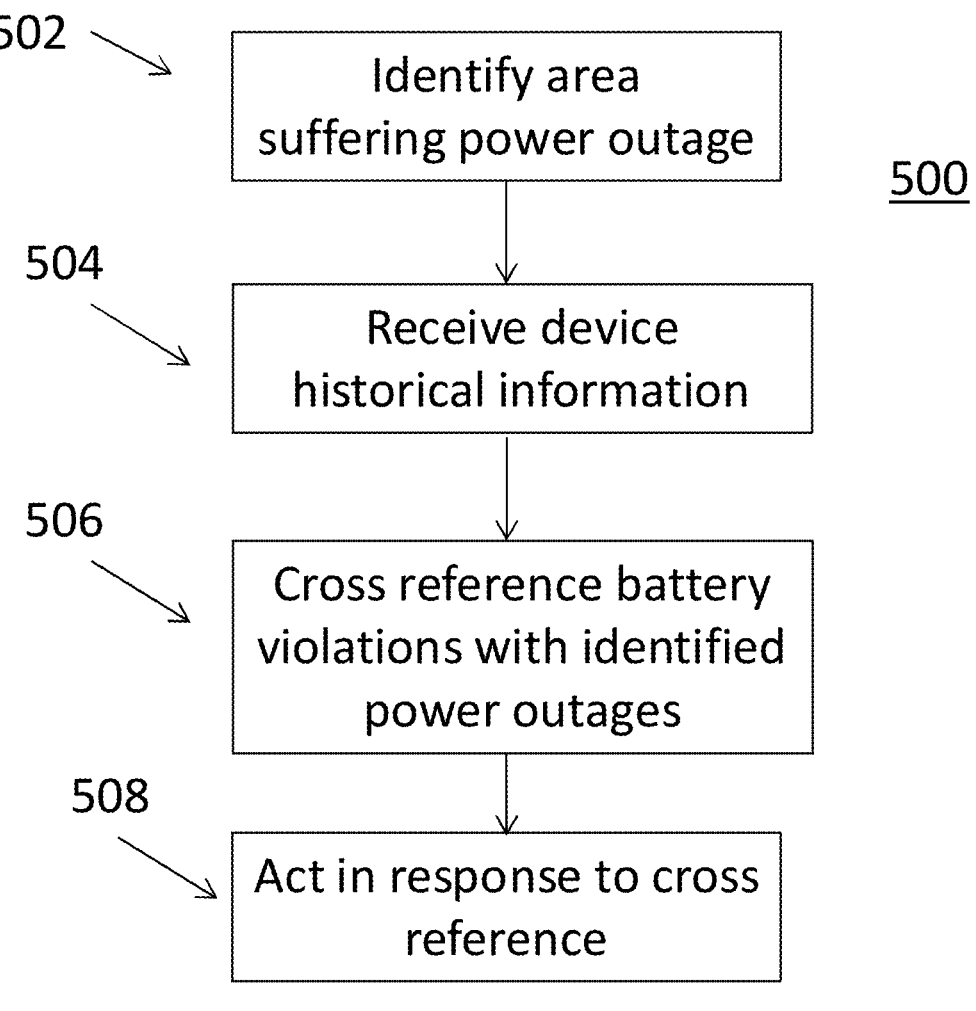
FIG. 5 illustrates a flowchart to determine whether a power outage may have contributed to a battery violation.

Referring now to FIG. 5, a flowchart 500 is shown for addressing the impact of past power outages. At step 502 the system receives information that defines the physical area and/or duration of a power outage. Such data may be acquired directly from the local utility, or be entered by authorized personnel.

Such power outage data may also be available, or at least inferable, from the monitoring programs' own equipment. Some monitoring programs provide monitored persons with location installed accessory equipment (such as BLUHOME as sold by Applicant) that runs off of local power. If power is lost, that equipment can transfer to internal battery power and report the power loss to the central monitoring 310. Central monitoring 310 can interpret such a power loss as a power outage. As a practical matter loss of power for only one signal source is not conclusive (e.g., the parolee could have just shut off power at the fuse box, but at the very least this may be investigable), but if the problem is observed over multiple signal sources over a deployed area (e.g., all signal sources within a one mile area), then this would tend to indicate a power outage. Central authority can either accept those results or contact the utility power company for further information.

At step 504 device historical information is received from personal monitoring device 102. Such current information may include location information and battery status information, in particular any battery violations. At step 506, central monitoring 310 cross references the identified power outage with historical location information and battery status information to determine whether a battery violation occurred while the monitored person was within the scope of the power outage.

If the cross reference at step 506 indicates that the battery violation was linked to a power outage, central monitoring 310 and/or authorized person 312 can take one or more reactionary steps at step 508 to address the same. There are a variety of possible reactions, and the invention is not limited to a particular reaction.

A non-limiting example of a reaction may be to enter a note in the monitored person's record to that effect, so that it may be considered a mitigating or neutralizing factor for the violation itself.

Another non-limiting example of a reaction may be to notify an authorized person of the situation so that they can take any actions they deem appropriate.

Step 506 may be considered conclusive of the responsibility, or lack thereof, for a battery violation. However, the battery violation could be coincidental with a power outage for which the authorized person 312 does not wish to allow it to slide. For example, if the battery was about to die and there was suddenly a power outage, the authorities may still consider it the responsibility of the parolee to have charged earlier. Step 506 could thus also include an analysis of whether the duration of the power outage meaningfully (as opposed to coincidentally) prevented charging (e.g., power was out for a full day). Step 506 could also consider whether, based on the methodology of FIG. 4, the parolee did not avail themselves of an earlier opportunity to charge the battery. Any or all of these factors may be taken into account in deciding how to act at step 508.

Figure 6:
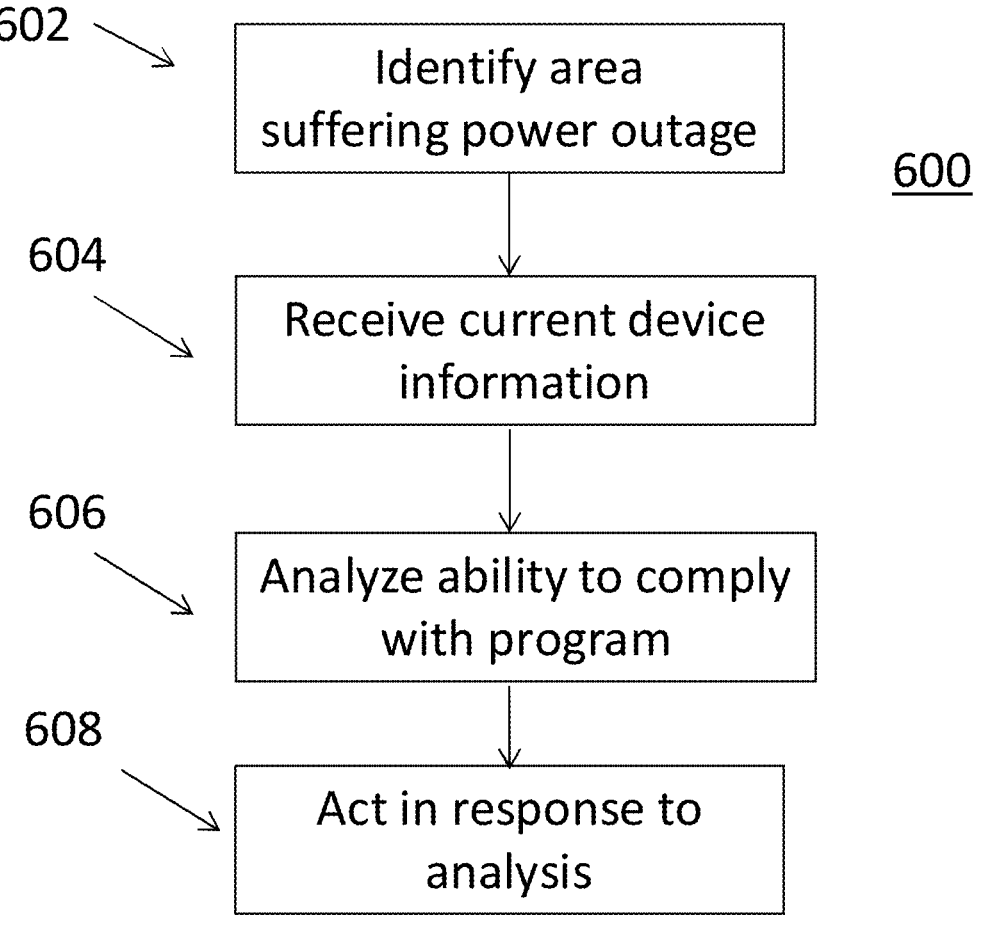
FIG. 6 illustrates a flowchart to determine whether a power outage may contribute to a future battery violation.

The above methodology is based on past consideration of battery violations relative to historical data. However, the invention is not so limited, and may involve real time events. Referring now to FIG. 6, a flowchart 600 is shown for addressing the impact of past power outages.

At step 602 the system receives information that defines the physical area and/or duration of a power outage. The methodology for receiving such information is similar to that of step 502 and is not further discussed herein.

At step 604 the system receives current device information from monitoring device 102. At step 606 the system analyzes the ability of the monitored person to comply with the requirements of the monitoring program relative to the lack of available power. Non-limiting examples of potential non-compliance would be an inability to charge the battery (which as noted above may be difficult or impossible), or the need to travel to a location such as work that is now closed.

At step 608 the system reacts in response to the circumstances. Non-limiting examples of reactions are discussed with respect to step 508 for battery violations. Another non-limiting example of a reaction may be to contact the monitored person with questions (e.g., "please confirm whether your home has power"), device instructions (e.g., "connect your device to a power outlet" to allow monitored device 102 to report that is unable to receive power) or personal instructions (e.g., "remain at your location until further notice" or "travel immediately the police station"). Central monitoring 310 and/or authorized person 312 could alter the monitored person's schedule to accommodate these changes. By way of non-limiting example, if the monitored person is supposed to leave home at 9 AM and arrive at work by 10 AM, that schedule can be revised to extend the stay at home period while canceling the appear at work requirement.

The same methodology as above could be applied to loss of signal at cell towers if cell coverage is suddenly lost, such that monitored device 102 was no longer able to report information to central monitoring 310. The methodology would track that of FIGS. 5 and 6, save that the inquiry would be for inactive cell towers rather than power outages.

Information from predictive engine 900 may influence the nature of the reaction at step 508 or 608. Predictive engine 900 can analyze information about the particular monitored person and determine whether the monitored person is more or less likely to take advantage of the power outage to engage in prohibited activity that cannot be monitored due to the power loss. For example, the predictive engine 900 may indicate that generally a 50-year-old woman is unlikely to engage in prohibited behavior while a 20 year old man is likely to engage in such behavior. Such class specific assessment may also be adjusted on a personal basis, in that a particular 50-year-old woman with a history of violations may be a higher risk whereas a particular 20 year old man with no history of violations may be a lower risk.

On-Time Arrival

Most parolee programs utilize so-called inclusion zones to define where a monitored person is supposed to be at during certain times. For example, a monitored person is supposed to be at work from 9 AM-5 PM, home from 7 PM-7 AM, and gaps between allow for travel time. It is a program violation if current information from monitoring device 102 shows that the monitored person is not within the inclusion zone during the designated periods.

A natural obstacle to on time arrival at a location is travel conditions, such as traffic and timeliness of public transportation. A monitored person may typically be able to leave work and return home within the designated periods, but there may be occasions in which conditions change in a manner that prevents timely arrival. If the monitored person needs to cross a bridge to get home on time and the bridge suddenly closes, or if the public transportation is delayed, it may simple not be possible for the monitored person to get home on time. This inclusion zone violation is therefore technically a program violation, but arguably it is not the fault the monitored person if conditions simply prevented compliance.

Referring now to FIG. 7, a flowchart 700 is shown. At step 702, central monitoring 310 accesses its own records of movement history to at step 704 identify patterns in the monitored person's behavior relative to their obligations. For example, the analysis may determine that the monitored person is due home at 7 PM, for which they have a pattern of behavior to leave work at 6 PM and arrive home at 6:45 PM. The methodology may also identify variances from that typical behavior, such as leaving later than 6 PM and/or leaving on time yet arriving home later than 6:45 PM.

Central monitoring 310 may be particular to the tracking of the monitoring devices 102, and thus lacks access to information in other databases, such as traffic and public transportation (e.g., train, bus) activity. At step 706, central monitoring reaches out to external databases of third-party sources for travel information, such as GOOGLE MAPS for traffic, and/or whatever local agency is responsible for the trains/buses schedules and delays.

At step 708, central monitoring 310 analyzes the movement patterns for a monitored person to determine the impact of travel conditions on how long it takes the moni-tored person to travel between locations. Continuing with the above example, movement patterns may show the monitored person tends to arrive early at 6:45 PM under normal traffic conditions, and consistently after 7 PM (and thus a violation of the inclusion zone requirement) under heavy traffic conditions.

Two processes may flow from step 708. The first process is a historical analysis to identify if travel conditions (e.g., traffic, public transit delay) were responsible for an inclusions zone violation. At step 710 the methodology cross references any inclusion zone violations with unusual travel conditions that would account for the violation. For example, if the monitored person left work at their usual 6 PM, and movement patterns show that they normally arrive home at 6:45 PM but on this occasion arrived past curfew, the methodology can examine the traffic data for any unusually traffic patterns on the monitored person's travel route during that period that would have inhibited or prevented curfew compliance. If such conditions are present, at step 712 a note can be entered into the monitored person's record to that effect, such that the unusual traffic pattern may be considered a mitigating or neutralizing factor for the violation itself.

The second process is a real time analysis that observes the onset or presence of traffic conditions that would interfere with program compliance. At step 714 the methodology determines, based on movement patterns, current location and traffic information, an optimum time for the monitored person to transition from their current location to the inclusion zone. At step 716 the methodology sends a notice to the monitored person when they should leave their current location to maintain program compliance.

By way of non-limiting example, if the monitored person is (a) at work, (b) movement patterns show they normally leave at 6 PM for 7 PM curfew at home and (c) traffic conditions are normal, then the system may send a notice at 5:50 PM to the monitored person that traffic is normal with reminder and they will arrive home on time if the leave by 6 PM. But if traffic conditions are heavy or worsening, the system may send a notice earlier, such as 5:30 PM, to the monitored person that traffic is heavy, and they need to leave by a specific earlier time to arrive home within curfew. In yet another example, the person normally leaves at 6 PM but location data shows that they are still at work say at 6:10, the system may send a notice that they need to leave immediately else risk an inclusions zone violation.

Such messages may include opportunities for the monitored person to respond, e.g., that the monitored person is not being allowed to leave work yet. This may ultimately lead to a violation, but the circumstances will be documented in real time and a note can be entered into the monitored person's record to that effect and may be considered a mitigating or neutralizing factor for the violation itself.

At step 718, the methodology can alter the inclusion zones to account for traffic changes. By way of non-limiting example, if the inclusions zone for home starts curfew at 7 PM but traffic is creating a 15-minute delay, central monitoring 310 can adjust the curfew time to begin at 7:15 PM. In another example, the inclusion zone may be a particular corridor that the monitored person must travel (e.g., certain streets, certain highways), for which central monitoring can change the corridor to allow for alternative routes that avoid the traffic conditions.

Information from predictive engine 900 may influence the above steps. Predictive engine 900 can analyze information about the particular monitored person and determine whether the monitored person is more or less likely to address traffic problems on their own. For example, the predictive engine may indicate that a 20-year-old man is likely to drive faster in a time crunch while a 50 year old woman may not. Such class specific assessment may also be adjusted on a personal basis, in that a particular monitored person with a history of violations may be a higher risk whereas a different person with no history of violations may be a lower risk.

Mobile Support

Parole officers often can access information about parolees through either a desktop web portal on their personal computer or a mobile app on their mobile devices. The desktop web portal is typically the more robust of the two, providing information beyond that which is available on the mobile app and which is often needed for more problematic monitored individuals. However, Applicants have observed that parole officers increasingly tend to use their mobile phones more than their personal computers, and thus certain information may not be available to them. This transition to reliance on the mobile app conflicts with the need to consult with the desktop web portal for the more robust information.

An embodiment herein is directed to using the predictive engine 900 to analyze both the monitored population and the parole officer to improve response conditions. Referring now to flowchart 800 in FIG. 8, at step 802 the methodology can categorize/stratify monitored persons based on their behavior into various categories to know that they are more problematic and need more advanced features of the desktop for review by the authorized person 312. At step 804, the methodology analyzes authorized person's 312 travel movements and use of the mobile and desktop platforms. Prediction engine 900 identifies patterns at step 806 in the data for circumstances that led up to the authorized person checking the desktop app. For example, the patterns may show that the authorized person 312 travels from home to the parolee office in the early AM and then uses the desktop app, but does not use the desktop app at other locations or if they arrive at the office later in the day.

At step 808, the methodology determines whether to send the authorized person 312 a notification to check the desktop web portal and send the notification under designated conditions. For example, if step 806 predicts that the authorized person 312 will be proximate to a desktop web portal, then the system may send a notification simply due to proximity. In another example, the notification may be sent due to a combination of the prediction and the presence of activity at step 802 that requires further consultation through the web portal. In yet another example, the methodology may withhold a scheduled reminder message if there is no need to consult the web portal, or if the authorized person is deviating from the predicted pattern such that send a reminder would not be valuable at that time.

The above methodology improves the agent workflow and ease of use. It also improves the prospects for an enrollee's successful completion of the program because the agent is more engaged and pro-actively helping them to correct behavior.

Figure 11:
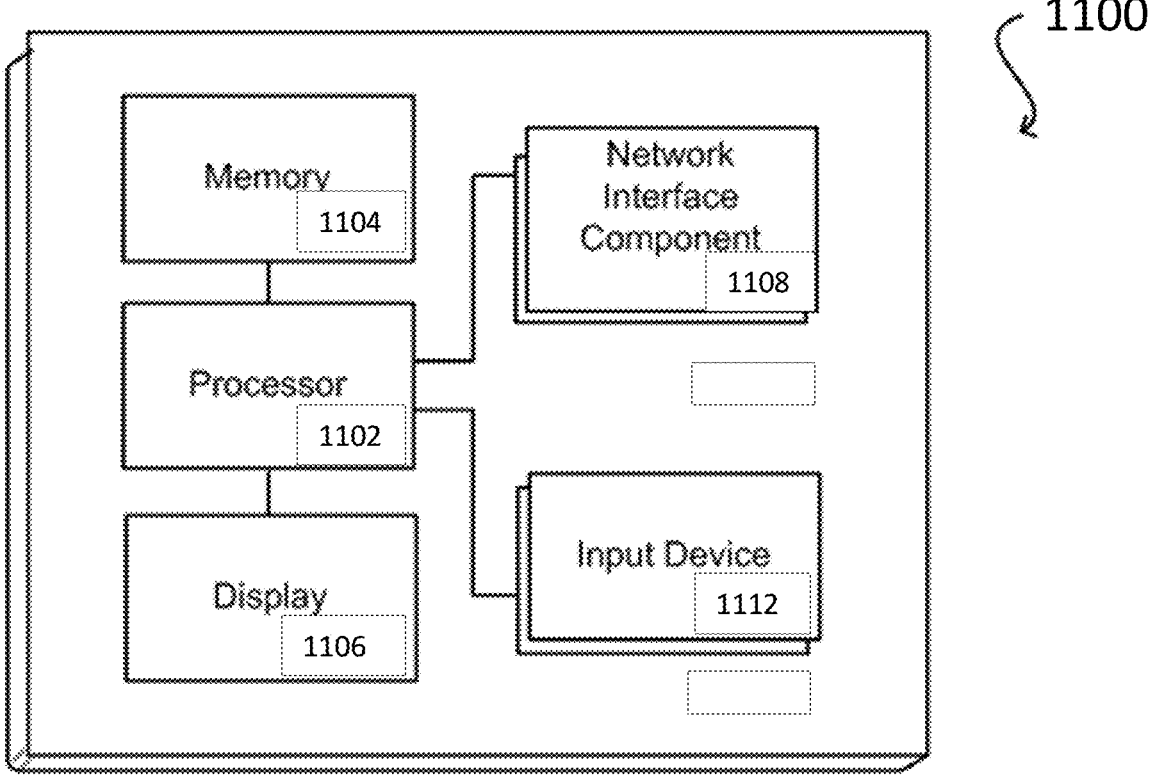
FIG. 11 illustrates a logical arrangement of a set of general components of an example computing device that can be utilized in accordance with various embodiments.

FIG. 11 illustrates a logical arrangement of a set of general components of an example computing device 1100 as could be used for the computer elements of any electronics discussed herein, including monitoring device 102, predictive engine 900, etc. In this example, the device includes a processor 1102 for executing instructions that can be stored in a memory device or element 1104. As would be apparent to one of ordinary skill in the art, the device can include many types of memory, data storage, or non-transitory computer-readable storage media, such as a first data storage for program instructions for execution by the processor 1102, a separate storage for images or data, a removable memory for sharing information with other devices, etc. The device typically will include some type of display element 1106, such as a touch screen or liquid crystal display (LCD), although devices such as portable media players might convey information via other means, such as through audio speakers. As discussed, the device in many embodiments will include at least one input element 1112 able to receive conventional input from a user. This conventional input can include, for example, a push button, touch pad, touch screen, keyboard, mouse, keypad, or any other such device or element whereby a user can input a command to the device. In some embodiments, the computing device 1100 of FIG. 11 can include one or more network interface elements 1108 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose individual computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, an individual of ordinary skill in the art will appreciate other ways and/or methods to implement the various embodiments.

The above embodiments refer to location based on GPS coordinates and corresponding equipment to process GPS data. However, the invention is not limited to any particular location methodology, and other methodologies could also be used.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for monitoring and maintaining battery charge of a personal monitoring device, comprising:
locking the personal monitoring device to a limb of a monitored person, wherein the locking requires that the monitored person remain tethered to a power source for a period of time to charge a battery of the personal monitoring device;
collecting historical information about the personal monitoring device including movement data of the personal monitoring device and battery charging history of the personal monitoring device;
analyzing the collected historical information for historical patterns of battery charging behavior;
receiving a current location of the personal monitoring device;
determining whether to send a battery charge reminder to the monitored person, based on at least a current location of the personal monitoring device, a current battery charge, and the historical patterns of battery charging behavior; and
providing, in response to a positive outcome of the determining, a notification to the monitored person to charge the battery;
wherein the determining comprises:
determining that the personal monitoring device is at a first location with a history of successfully battery charging;
predicting that the personal monitoring device will leave the first location with a history of successful battery charging and enter a second location that lacks a history of successful battery charging; and
predicting that, absent additional charge at the first location, the battery charge will drop below a threshold level when the personal monitoring device is at the second location that lacks a history of successful battery charging.

2. The method of claim 1, further comprising:
collecting personal information about the monitored person; and
the determining is based on the collected personal information about the monitored person.

3. The method of claim 2, further comprising:
collecting personal information about a monitored population; and
the determining is based on the collected personal information about the monitored population.

4. The method of claim 3, wherein the determining considers characteristics of the monitored person relative to common characteristics or prior behavior of the monitored population, including how those common characteristics or prior behavior affect probabilities of potential battery violations.

5. The method of claim 4, wherein the characteristics includes any of race, age, gender, weight, height, home address, work address, prior criminal history, prior status as a parolee, prior violations, prior behavior and/or effect of prior reminders.

6. The method of claim 1, wherein the determining comprises:
determining that the personal monitoring device is at a location during a time frame with a history of successfully battery charging;

awaiting, for a portion of the time frame, receipt a signal representing that the battery of the personal monitoring device has commenced charging; and the providing being in response to elapse of the portion of the time frame without receipt of the signal.

7. The method of claim 6, further comprising:

bypassing the providing in response to receipt of the signal during the portion of the time frame.

8. A system for monitoring and maintaining battery charge of a personal monitoring device, the system comprising:

the personal monitoring device including a lockable band to lock the personal monitoring device to a limb of a monitored person, wherein when locked the monitored person must remain tethered to a power source for a period of time to charge a battery of the personal monitoring device;

electronic computer hardware in combination with software programmed to perform operations comprising:

collecting historical information about the personal monitoring device including movement data of the personal monitoring device and battery charging history of the personal monitoring device;

analyzing the collected historical information for historical patterns of battery charging behavior;

receiving a current location of the personal monitoring device;

determining whether to send a battery charge reminder to the monitored person, based on at least a current location of the personal monitoring device, a current battery charge, and the historical patterns of battery charging behavior; and providing, in response to a positive outcome of the determining, a notification to the monitored person to charge the battery;

wherein the determining comprises:

determining that the personal monitoring device is at a first location with a history of successfully battery charging;

predicting that the personal monitoring device will leave the first location with a history of successful battery charging and enter a second location that lacks a history of successful battery charging; and predicting that, absent additional charge at the first location, the battery charge will drop below a threshold level when the personal monitoring device is at the second location that lacks a history of successful battery charging.

9. The system of claim 8, the operations further comprising:

collecting personal information about the monitored person; and the determining is based on the collected personal information about the monitored person.

10. The system of claim 9, the operations further comprising:

collecting personal information about a monitored population; and the determining is based on the collected personal information about the monitored population.

11. The system of claim 10, wherein the determining considers characteristics of the monitored person relative to common characteristics of the monitored population, or prior behavior including how those common characteristics affect probabilities of potential battery violations.

12. The system of claim 11, wherein the characteristics includes any of race, age, gender, weight, height, home address, work address, prior criminal history, prior status as a parolee, prior violations, or prior behavior and/or effect of prior reminders.

13. The system of claim 8, wherein the determining comprises:

determining that the personal monitoring device is at a location during a time frame with a history of successfully battery charging;

awaiting, for a portion of the time frame, receipt a signal representing that the battery of the personal monitoring device has commenced charging; and the providing being in response to elapse of the portion of the time frame without receipt of the signal.

14. The system of claim 13, the operations further comprising: bypassing the providing in response to receipt of the signal during the portion of the time frame.

* * * * *